United States Patent [19]

Pong et al.

[11] Patent Number: 5,335,928

[45] Date of Patent: Aug. 9, 1994

[54] BICYCLE BOTTOM BRACKET/CRANK ASSEMBLY

[75] Inventors: Alex Pong, Langley; Skooks Pong, Freeland, both of Wash.

[73] Assignee: Cannondale Corporation, Georgetown, Conn.

[21] Appl. No.: 122,147

[22] Filed: Sep. 16, 1993

[51] Int. Cl.⁵ ............................................. G05G 1/14
[52] U.S. Cl. .................................. 280/259; 74/594.2; 384/458
[58] Field of Search ............... 280/259, 260, 261, 262; 74/594.1, 594.2; 384/458

[56] References Cited

U.S. PATENT DOCUMENTS 951,137  3/1910  Lowrance ........................... 384/458

FOREIGN PATENT DOCUMENTS

| 103891 | 5/1898 | Fed. Rep. of Germany | 74/594.2 |
| 48505 | 5/1985 | France | 74/594.2 |
| 364492 | 2/1973 | U.S.S.R. | 280/259 |
| 2837 | of 1898 | United Kingdom | 74/594.2 |

Primary Examiner—Margaret A. Focarino
Assistant Examiner—Kevin Hurley
Attorney, Agent, or Firm—Brumbaugh, Graves, Donohue & Raymond

[57] ABSTRACT

A bicycle comprises a frame having a sleeve portion adapted to support a bottom bracket/crank assembly and having an annular opening having its axis oriented substantially orthogonally to a vertical-longitudinal center plane of the bicycle, a bearing support ring attached to the sleeve portion in cantilevered relation and having an external bearing seat surface oriented substantially orthogonally to the vertical-longitudinal center plane, and a thin wall large diameter angular contact bearing having an inner race received on the bearing seat surface of the ring. A driving sprocket wheel set having an internal bearing seat surface is received on an outer race of the bearing. A first crank member having a crank arm located on the side of the sprocket wheel set opposite from the frame sleeve portion is fastened to the sprocket wheel set for rotation therewith. A sleeve portion of the first crank member overlies the opening in the sleeve portion. A second crank member having a crank arm located on the side of the frame sleeve portion opposite from the sprocket wheel set includes a sleeve portion overlying the opening in the frame sleeve portion. Fasteners connect the ends of the sleeve portions of the crank members, which abut each other, to each other. The driving sprocket wheel and bearing are offset from the center plane of the bicycle and in line with the driven sprocket wheel, which virtually eliminates lateral torque loads on the bearing due to chain pull.

9 Claims, 3 Drawing Sheets

BICYCLE BOTTOM BRACKET/CRANK ASSEMBLY

BACKGROUND OF THE INVENTION

In most bicycles, the pedal crank and driving sprocket wheel set are attached to a cross shaft that is journaled in ball bearings received within a bottom bracket shell attached to the down tube, seat tube and chain stays of the bicycle frame. Ordinary ball bearings carry loads that act perpendicular to the axis of rotation of the shaft. Accordingly, torques applied to a shaft mounted in them in a direction tending to skew the shaft resolve as forces on the bearings that are a function of the distance between them. The diameter of the bearings is of little consequence to the bearing loads due to torques on the supported member tending to skew the member. In conventional bottom bracket designs, therefore, it is suitable to have a bottom bracket shell of a relatively small diameter. The axial length of the shell and the axial spacing of the bearings are limited by the lateral offset of the driving sprocket wheel set and is generally small. Accordingly, bearing loads due to lateral torques (lateral with respect to the shaft axis) applied to the bottom bracket shaft due to leg forces on the crank arms and the pulling force on the drive chain are high.

The bearings in conventional bottom bracket assemblies are usually centered on the vertical-longitudinal center plane of the bicycle, while the driving sprocket wheel set is offset from that plane so as to be in line with the driven sprocket wheel set attached to the rear wheel. The chain pulling force, therefore, always produces a torque on the bottom bracket shaft tending to skew the shaft. During part of each rotation of the crank, the leg forces on the crank act produce lateral torques in the same direction as the chain pull force. The bottom bracket bearing loads dues to lateral torques are, therefore, large and reduce efficiency and cause wear.

SUMMARY OF THE INVENTION

One object of the present invention is to provide a bicycle having a bottom bracket/crank assembly that is strong and stiff and, therefore, is durable and resists large torques due to leg forces and chain pull forces and resists deflections due to those loads. Another object is to provide a bottom bracket/crank assembly that is of simple construction, of low cost, light in weight, and easy to assemble and disassemble.

There is provided, in accordance with the present invention, a bicycle comprising a frame having a sleeve portion adapted to support a bottom bracket/crank assembly and having an annular opening having its axis oriented substantially orthogonally to a vertical-longitudinal center plane of the bicycle, a bearing support ring attached to the sleeve portion in cantilevered relation and having an external bearing seat surface oriented substantially orthogonally to the vertical-longitudinal center plane, and at least one bearing having an inner race received on the bearing seat surface of the ring. A driving sprocket wheel set having an internal bearing seat surface is received on an outer race of the bearing. A first crank member having a crank arm located on the side of the sprocket wheel set opposite from the frame sleeve portion is fastened to the sprocket wheel set for rotation therewith. A portion of the first crank member overlies the opening in the sleeve portion. A second crank member having a crank arm located on the side of the frame sleeve portion opposite from the sprocket wheel set includes a portion overlying the opening in the frame sleeve portion. Fasteners connect the portions of the crank members that overlie the opening in the sleeve to each other.

In preferred embodiments, the bearing and the driving sprocket wheel set are offset from the center plane. Advantageously, the offset is such that the bearing and driving sprocket wheel set are substantially aligned with a driven sprocket wheel set associated with a rear of the bicycle. As discussed above, efficiency and durability are enhanced using a thin wall large diameter angular contact bearing.

The portions of the crank members that overlie the frame sleeve opening, preferably, have ends that abut each other, and the fasteners may be screws that pass through holes in one of end portions and thread into the other of the end portions. The frame sleeve portion should be offset from the center plane to locate it close to the bearing support ring. The crank arms are, optionally, monocoques.

The provision of a cantilevered bearing support ring around an opening in the frame sleeve and the connection of portions of the crank arm that overlie the opening to each other greatly simplifies the structure and the assembly procedure. The offset of the bearing so that it is line with the driven sprocket wheel set virtually eliminates the skewing torque loads on the bearing due to chain pull, thus loading the bearing more equally, increasing efficiency and reducing wear.

Reduced bearing loads and greater stability and durability are provided by the use of thin wall large diameter angular contact bearings. As used throughout the present specification, the term "thin wall large diameter angular contact bearing" refers to the following specific bearing types: a pair of axially spaced apart large diameter thin section angular contact ball bearings; a single large diameter thin section four point split inner race ball bearing; and a single large diameter thin section crossed roller bearing. A thin wall large diameter angular contact bearing resolves lateral torque loads tending to skew the supported member along vectors oblique to the axis of rotation of the member, and thus the bearing loads due to such lateral torques are considerably reduced, as compared with ordinary ball bearings.

For a better understanding of the invention, reference may be made to the following description of an exemplary embodiment, taken in conjunction with the accompanying drawings.

DESCRIPTION OF THE EMBODIMENT

The bicycle shown in FIG. 1 incorporates several highly unique features, which include those described and shown in the following patent applications that are filed concurrently with the present application and that are hereby incorporated by reference into the present specification:

Ser. No. 08/122,140, entitled "Monocoque Bicycle Wheel";
Ser. No. 08/122,142, entitled "Bicycle With Trailing Arm Wheel Suspensions";
Ser. No. 08/122,143', entitled "Bicycle Wheel Mount";
Ser. No. 08/122,097, entitled "Bicycle Headset"; and
Ser. No. 08/122,098, entitled "Bicycle Frame".

Figure 1:
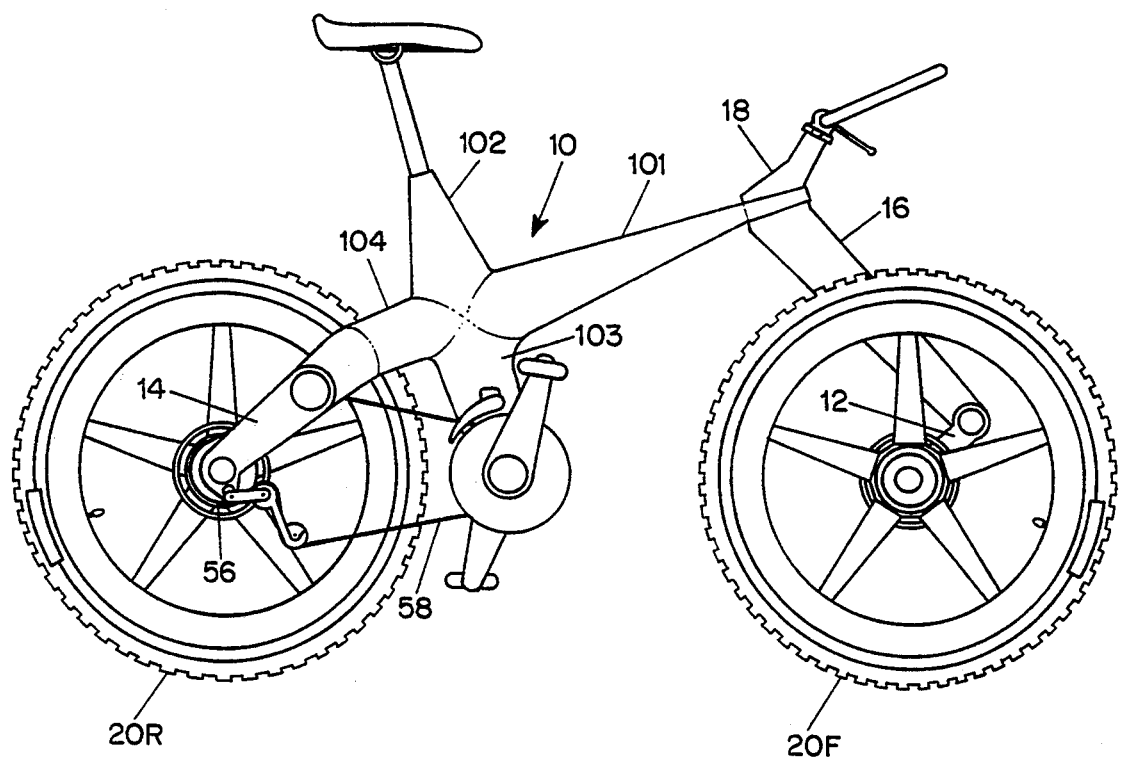
FIG. 1 is a side elevational view of a bicycle equipped with an embodiment of the bottom bracket assembly.

Many of the structural components of the bicycle of FIG. 1 are of monocoque construction, including the frame 10, the swing arms 12 and 14 of the trailing arm wheel suspensions, the front wheel-mounting arm member 16, and the handlebar support member 18, which is affixed to the wheel-mounting arm member 16 and rotatably mounted in a collar at the front of the frame 10 by a unique headset assembly. The frame is generally "t"-shaped (the "t" being oriented sideways to present an inclined front leg portion 101, a seat support arm portion 102, a bottom bracket/crank support arm portion 103 and a short, bent rear leg portion 104, to which the rear swing arm 14 is attached. Unlike conventional bicycles, in which the wheels are carried on axles extending between members that straddle the wheels (front fork legs and rear triangles), the front and rear wheels 20F and 20R (which are preferably identical) are mounted on one side of the respective swing arms 12 and 14, which permits them to be removed and replaced laterally rather than vertically. The monocoque form of the structural components of the bicycle makes them strong and rigid but permits them to be of light weight. The present invention can be used in bicycle having frames and other structural components of virtually any suitable construction.

Another aspect of the construction of the bicycle is the use of thin wall large diameter angular contact bearings in all pivot connections and journals, including the steering headset, wheel journals, swing arms of the trailing arm suspensions, and the bottom bracket assembly. As discussed above, those bearings allow large moments to be applied to the supported members with low bearing loads due to torques applied to the supported members, occupy a minimum of space, increase efficiency, and enhance stability and durability, as compared with the multiple bearing sets within relatively small sleeves that are used in conventional headsets, bottom brackets and wheel journals.

Figure 2:
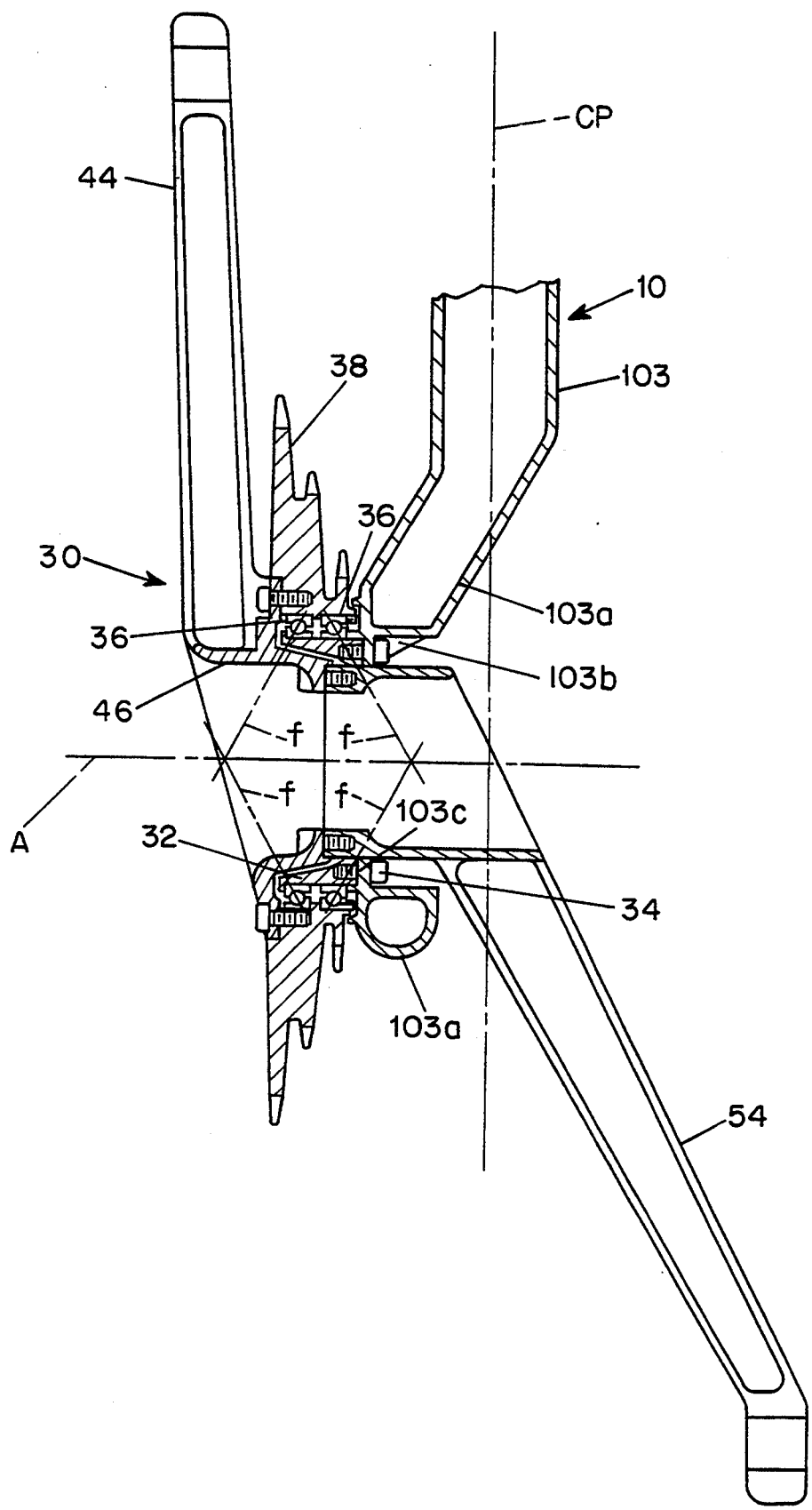
FIG. 2 is a front cross-sectional view of an embodiment of the bottom bracket/crank assembly, taken along the axis of rotation of the crank.
Figure 3:
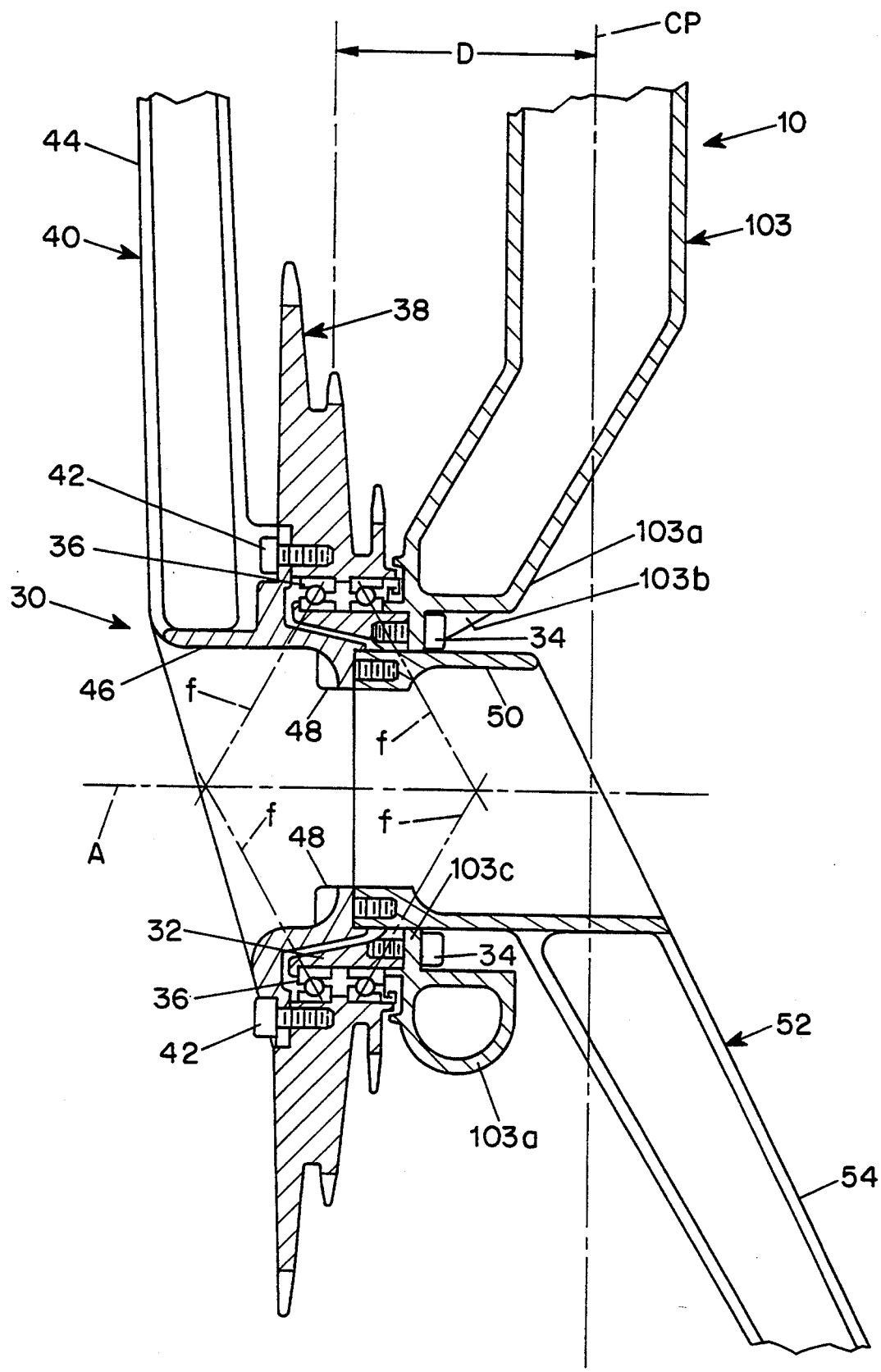
FIG. 3 is a portion of the view as FIG. 2 on a larger scale.

The bottom bracket/crank support arm portion 103 of the frame 10 has a sleeve portion 103 that supports a bottom bracket/crank assembly 30 and has an annular opening 103b having its axis oriented substantially orthogonally to a vertical-longitudinal center plane CP of the bicycle. A bearing support ring 32 is attached to an inwardly extending flange 103c in the sleeve portion 103a in cantilevered relation and has an external bearing seat surface oriented substantially orthogonally to the vertical-longitudinal center plane. The inner races of a pair of axially spaced apart large diameter thin section angular contact ball bearings 36 are received on external bearing seat surfaces of the support ring 32. The bearing 36 may be replaced by a single large diameter thin section four point split inner race ball bearing or a single large diameter thin section crossed roller bearing. A thin wall large diameter angular contact bearing resolves torque loads tending to skew the supported member along vectors oblique to the axis of rotation of the member, as indicated by the lines f in FIGS. 2 and 3, and thus the bearing loads due to such skewing torques are considerably reduced.

A driving sprocket wheel set 38 having an internal bearing seat surface is received on outer races of the bearings 36. A first crank member 40 having a crank arm 44 located on the side of the sprocket wheel set 38 opposite from the frame sleeve portion 103a is fastened to the sprocket wheel set for rotation therewith by fasteners, such as Allen head cap screws 42. A sleeve portion 46 of the first crank member overlies the opening in the sleeve portion and in the embodiment extends transversely toward the opening. Fasteners 48, such as Allen head cap screws, join the first crank member to a sleeve portion 50 of a second crank member 52, which has a crank arm 54 located on the side of the frame sleeve portion 103a opposite from the sprocket wheel set 38.

The driven sprocket wheel set 56 (FIG. 1) is located on the right side of the rear wheel mount, is coupled to the driving sprocket wheel set 38 by a chain 58, and is offset from the center plane CP by a distance D. The driving sprocket wheel set 38 and the bearings 36 are offset by substantially the same distance D from the center plane so as to be aligned longitudinally with the driven sprocket wheel set. As mentioned above, putting the bearings in line with the driven sprocket wheel essentially eliminates a lateral torque on the bearings due to chain pull.

The crank arms are, preferably but not necessarily, monocoques and can be made in various ways. For example, they may be made by forming two lateral half members, such as by casting, press-forming, machining or a combination of working processes, and may have stiffening ribs and varying wall thicknesses. The half sections are joined along mating edges by adhesive, mechanical or thermal connections. The arms may include an internal longitudinal spar and a multiplicity of internal ribs joined to the spar, the stressed skin being joined to the spar and ribs.

We claim:

1. A bicycle comprising a frame having a sleeve portion adapted to support a bottom bracket/crank assembly and having an annular opening having its axis oriented substantially orthogonally to a vertical-longitudinal center plane of the bicycle, a bearing support ring attached to the sleeve portion in cantilevered relation and having an external bearing seat surface oriented substantially orthogonally to the vertical-longitudinal center plane, at least one bearing having an inner race received on the bearing seat surface of the ring, a driving sprocket wheel set having an internal bearing seat surface received on an outer race of the bearing, a first crank member having a crank arm located on the side of the sprocket wheel set opposite from the frame sleeve portion, fastened to the sprocket wheel set for rotation therewith and having a portion overlying the opening in the sleeve portion, a second crank member having a crank arm located on the side of the frame sleeve portion opposite from the sprocket wheel set, and having a portion overlying the opening in the sleeve portion, and means for connecting the portions of the crank members that overlie the openings to each other.

2. A bicycle according to claim 1 wherein the bearing and the driving sprocket wheel set are offset from the center plane.

3. A bicycle according to claim 2 wherein the bearing and the driving sprocket wheel set are substantially aligned with a driven sprocket wheel set associated with a rear of the bicycle.

4. A bicycle according to claim 1 wherein the bearing is a thin wall large diameter angular contact bearing.

5. A bicycle according to claim 2 wherein the bearing is a thin wall large diameter angular contact bearing.

6. A bicycle according to claim 3 wherein the bearing is a thin wall large diameter angular contact bearing.

7. A bicycle according to claim 1 wherein the portions of the crank members that overlie the frame sleeve opening have ends that abut each other and the fastening means is a plurality of screws passing through holes in one of said portions and threaded into the other of the end portions.

8. A bicycle according to claim 2 wherein the frame sleeve portion is offset from the center plane.

9. A bicycle according to claim 1 wherein the crank arms are monocoques.

* * * * *